Patented Feb. 12, 1946

2,394,887

UNITED STATES PATENT OFFICE 2,394,887

METHOD AND MEANS OF RENDERING HARMLESS POISONOUS GASES IN THE ATMOSPHERE

Ernst Berl, Pittsburgh, Pa.

No Drawing. Application June 22, 1939, Serial No. 280,672. In Great Britain July 11, 1937

6 Claims. (Cl. 23—4)

The present invention is concerned with improvements in or relating to the decontamination of air containing organic poison gases and consists in the removal of these poisonous substances which in very minor concentration severely damage the human organism.

In accordance with the present invention the most effective poisons used in gas warfare, and particularly those based on organic arsenious compounds, can be transformed into harmless substances by suitable oxidation. The resulting secondary substances are harmless and can easily be eliminated by adsorption from the respiration air.

Peroxides, for example, potassium and/or sodium, and/or magnesium peroxides, or derivatives of hydrogen peroxide, for example, double compounds of hydrogen peroxide with weak bases such as urea, biuret, and the like; furthermore, organic peroxide compounds, for example, benzoyl peroxide and similar compounds, decontaminate with the greatest certainty air containing those poisons which are active even in very minute quantities. The poisons are converted into harmless products. The peroxides may be employed in conjunction with fats, waxes, or with solid or liquid hydrocarbons with or without the addition of high boiling solvents, for example, butyl phthalate and other phthalic acid esters. Wool grease, lanoline and the like substances may also be used. The poisons which are hydrophobe substances and therefore, easily soluble in the above-mentioned water-insoluble materials, are readily adsorbed and are transformed by the peroxides or other oxidising agents present into harmless substances which represent, for example, quinquevalent arsenic compounds.

For the same purpose the so-called halogen coals may be used with excellent effect. These are activated carbon charged with chlorine, bromine and iodine. Silica gel or similar substances with highly developed internal surfaces and which are charged with halogen may also be employed. Hypochlorites, hypobromites, and hypoiodites may be used for the same purpose.

The harmless products which are formed as a result of the oxidation of the poisonous substances by the halogen are adsorbed by the active substance, namely, activated carbon and/or silica gel. In order to remove the small amounts of halogen and hydrogen halides which are present in very small concentration in the decontaminated air, lignin or substances containing lignin, such as wood or jute, or compounds, for example, thiosulphates, or hexamethylenetetramine may be employed.

The above-mentioned combination of peroxides, or halogens, or hypochlorites, and the like, in conjunction with fats, waxes, wool grease, lanoline, activated substances such as activated coal, and the like can be used in the filter drums of gas masks. The effect of the poisonous substances on the skin may be nullified by smearing the skin, for example, with the peroxide-lanoline combination. As a result of this treatment, no formation of blisters on the skin takes place.

The following examples serve to illustrate but do not restrict the invention:

Example 1

An organic peroxide, for example, benzoyl peroxide is applied to a granular carrier, such as activated carbon or to a tissue, made, for example, from asbestos. The impregnation may be effected by intimately incorporating the finely divided benzoyl peroxide, or other organic peroxide, with a solution of ethyl or benzyl cellulose, or another cellulose ester, in an organic solvent. The resulting mixture is then applied to the granular carrier or to the tissue. Only a few percent of the binding agent (cellulose ether or other suitable binding agent) calculated on the weight of the organic peroxide are necessary.

Peroxide containing hydrophobe material, such as fats, waxes, wool grease, lanoline, hydrocarbons, and derivatives thereof, high boiling esters such as phthalic acid ester, which possess the property of covering the granular carrier or the tissue, may also be employed.

On coming into contact with the above material containing peroxides, the gaseous liquid or solid poisonous substances are readily adsorbed by the wool grease, or lanoline, or fat, or high boiling organic solvent, and are instantly converted to non-poisonous substances which remain in solution or in suspension in the hydrophobe material (fat, lanoline, and the like), or alternatively they may be adsorbed by activated substances such as activated coals which are inserted behind the above-mentioned granular material or tissue.

The skin may be smeared with this combination and any attack of blister-producing poison avoided or nullified.

Example 2

Activated carbon and/or silica gel is/are charged with chlorine, or bromine, or iodine, or with a mixture of these halogens. Good quality activated carbon may be charged with more than 50% of its weight of chlorine, and with considerably higher percentages of bromine and iodine. The halogens may be vaporized and the activated coal and/or silica gel charged more or less by means of the vapors alone. Alternatively iodine may be dissolved, for example, in ether and the external and internal surfaces of the activated substance are obtained covered with iodine after evaporation of the ether. The evaporation of the solvent may be accomplished in vacuo and/or at somewhat elevated temperatures.

Air containing poisonous substances comes in contact with the lumps of halogen coal, or with finely divided activated coal, or with silica gel, charged with halogen and supported on a tissue as described in Example 1. The poison is instantly converted into harmless material. The air, thus freed from the poisonous substances originally present, now contains small amounts of halogen and halogen acids such as hydrochloric acid. These compounds may be eliminated easily by means of a mixture of alkali and lignin, for example, lime and lignin, or alkali and substances containing lignin such as, wood or jute. Alternatively, other materials which absorb halogens, for example, peroxides, thio-sulphates and the like may be employed.

It is understood that changes in the precise embodiment of the invention herein disclosed may be made within the scope of what is claimed without departing from the spirit of the invention. The scope of the invention therefore is to be limited by the claims only.

I claim:

1. A method of rendering harmless an organic poison gas in the air, comprising contacting air contaminated with an organic poison gas with an organic peroxide on a carrier.

2. A method of rendering harmless an organic poison gas, comprising contacting an organic substance contaminated with an organic poison gas with a peroxide on a carrier having a highly developed internal surface, said carrier being selected from the group consisting of activated cabon and silica gel.

3. A method of rendering harmless an organic poison gas in the air, comprising contacting air contaminated with an organic poison gas with an organic peroxide on a carrier having a highly developed internal surface, said carrier being selected from the group consisting of activated carbon and silica gel.

4. A method of rendering harmless an organic poison gas, comprising contacting air contaminated with an organic poison gas with an organic peroxide on a lanoline carrier.

5. As a new article of commerce, a substance for rendering harmless organic poison gases, comprising an organic peroxide on a carrier having a highly developed internal surface, said carrier being selected from the group consisting of activated carbon and silica gel.

6. A filter for an organic poison gas in the air comprising an organic peroxide on a carrier having a highly developed internal surface, said carrier being selected from the group consisting of activated carbon and silica gel.

ERNST BERL.